(12) United States Patent
Wehling

(10) Patent No.: US 10,252,656 B2
(45) Date of Patent: Apr. 9, 2019

(54) COVER FEED-THROUGH FOR A HEAD-RESTRAINT ROD OF A HEAD RESTRAINT

(71) Applicant: Johnson Controls Technology Company, Holland, MI (US)

(72) Inventor: Karsten Wehling, Burscheid (DE)

(73) Assignee: ADIENT LUXEMBOURG HOLDINGS S.A.R.L., Luxembourg (LU)

( * ) Notice: Subject to any disclaimer, the term of this patent is extended or adjusted under 35 U.S.C. 154(b) by 274 days.

(21) Appl. No.: 14/905,082

(22) PCT Filed: Jul. 15, 2014

(86) PCT No.: PCT/EP2014/065096
§ 371 (c)(1),
(2) Date: Jan. 14, 2016

(87) PCT Pub. No.: WO2015/007715
PCT Pub. Date: Jan. 22, 2015

(65) Prior Publication Data
US 2016/0159259 A1    Jun. 9, 2016

(30) Foreign Application Priority Data

Jul. 18, 2013 (DE) .................. 10 2013 214 146
Aug. 15, 2013 (DE) .................. 10 2013 216 214

(51) Int. Cl.
*B60N 2/809* (2018.01)
*B60N 2/58* (2006.01)
*B60N 2/897* (2018.01)

(52) U.S. Cl.
CPC .......... *B60N 2/809* (2018.02); *B60N 2/5816* (2013.01); *B60N 2/897* (2018.02)

(58) Field of Classification Search
CPC .......... B60N 2002/4897; B60N 2/4808; B60N 2/5816; B60N 2/809; B60N 2/897; A47C 31/11
USPC .............. 297/410, 463.1, 452.38; 16/2.1, 2.5
See application file for complete search history.

(56) References Cited

U.S. PATENT DOCUMENTS 5,080,437 A    1/1992 Pesta et al.
2009/0184557 A1   7/2009 Runde

FOREIGN PATENT DOCUMENTS

| CN | 2013 33955 Y | 10/2009 |
| DE | 10 2007 010 064 A1 | 9/2008 |
| DE | 10 2011 008692 A1 | 7/2012 |
| FR | 2 471 760 A1 | 6/1981 |

(Continued)

OTHER PUBLICATIONS

Chinese Office Action dated Dec. 2, 2016.

*Primary Examiner* — Milton Nelson, Jr.
(74) *Attorney, Agent, or Firm* — McGlew and Tuttle, P.C.

(57) ABSTRACT

A cover feed-through (B), for a head-restraint rod (5) of a head restraint for a vehicle seat, is configured as a one-piece self-securing guide element (1). The guide element has a closed upper face (2) and a lower face (4) which is spaced from the upper face by a passage (3). The lower face (4) has at least one opening (4.1) substantially in the form of a segment of a circle. A vehicle seat is also provided, including a cover (8) and a head-restraint which can be arranged in a cover feed-through (B).

24 Claims, 15 Drawing Sheets

(56) References Cited

FOREIGN PATENT DOCUMENTS

JP        H06 44 894 B2      6/1994
JP        2001012657 A   *   1/2001

\* cited by examiner

COVER FEED-THROUGH FOR A HEAD-RESTRAINT ROD OF A HEAD RESTRAINT

CROSS REFERENCE TO RELATED APPLICATIONS

This application is a United States National Phase Application of International Application PCT/EP2014/065096 filed Jul. 15, 2015 and claims the benefit of priority under 35 U.S.C. § 119 of German Patent Applications 10 2013 214 146.7 filed Jul. 18, 2013 and 10 2013 216 214.6 filed Aug. 15, 2013 the entire contents of which are incorporated herein by reference.

FIELD OF THE INVENTION

The invention relates to a cover feed-through for a head-restraint rod of a head restraint of a vehicle seat. Furthermore, the invention relates to a vehicle seat.

BACKGROUND OF THE INVENTION

Various cover feed-throughs which are customarily of multi-part design are known from the prior art.

DE 10 2007 010 064 A1 discloses a cover feed-through which comprises a first part engaging over the cutout in the cover and a second part which engages under the cutout in the cover and is connectable to the first part.

U.S. Pat. No. 5,080,437 A likewise discloses a two-part guide sleeve for head-restraint rods of a head restraint.

Furthermore, a head-restraint guide for the guidance and disposal of a head-restraint device is described in US 2009/0184557 A1. The head-restraint guide has a guide bush with an axial hole for the disposal of the head-restraint device therein. A lever is disposed pivotably within the guide bush, wherein the lever has an opening for receiving the head-restraint device. Furthermore, the head-restraint guide has a spring, the sections of which are prestressed against the head-restraint device. A pivoting of the lever in a first direction permits an axial adjustment of the head-restraint device. A pivoting of the lever in a second direction permits removal of the head-restraint device from the guide bush of the head-restraint guide.

Moreover, JP H06 44 894 B2 shows a vehicle seat and at least describes components of the vehicle seat.

SUMMARY OF THE INVENTION

It is an object of the present invention to specify an improved cover feed-through which is mountable in a simple manner and is producible cost-effectively. Furthermore, it is an object of the present invention to specify an improved vehicle seat.

A cover feed-through according to the invention for a head-restraint rod of a head restraint of a vehicle seat is designed as a single-part, self-fixing guide element and has a closed upper side and a lower side spaced apart from each other by a passage defining portion, wherein the lower side has at least one recess in the shape of a segment of a circle.

By means of the recess in the shape of a segment of a circle on the lower side of the cover feed-through, the cover feed-through can be inserted into an existing hole in a seat cover. By rotation of the cover feed-through, the latter is fixed in the seat cover, in particular is screwed in until the lower side has slid completely below the seat cover. Such a single-part and self-fixing solution for the cover feed-through permits a flexible mounting time, since the cover feed-through can be fixed to the seat cover both before and after mounting of the seat cover on the backrest. In other words, the single-part cover feed-through can be mounted even when a backrest is already covered. This is not possible in the case of the conventional two- or multi-part cover feed-throughs. For this purpose, the cover feed-through is designed as a single-component plastics part, for example as an injection molded part composed of acrylate-styrene-acrylonitrile/polyamide: ASA/PA for short. Alternatively, the use of other materials, for example acrylonitrile-butadiene-styrene, polypropylene, polyethylene, polycaprolactam, etc., is also possible.

For simple mounting of the seat cover, according to a possible development, the cover feed-through is of circular design and, by means of the inner passage, in particular of circular-ring-shaped design.

In a refinement, the upper side and the lower side are both formed in a circular-ring-shaped manner and, by means of the inner passage, are spaced apart from each other via an encircling radial gap. A seat cover, for example, is disposable in the radial gap.

In a possible development, the inner side of the passage defining portion has at least two mutually opposite, elastically deformable ribs which are formed lying radially inward from the inner side. For example, the ribs are formed in the manner of thin lips, and therefore the ribs can be deformed and/or bent away. The ribs are formed identically with the guide element, for example in the material, for example plastic. Alternatively, the cover feed-through is formed as a two-component plastics part, wherein the elasticity of the plastic from which the ribs are formed is in particular greater than the elasticity of the plastic from which the guide element is formed. Alternatively, radially inwardly projecting curvatures, a radially inwardly projecting, deformable inner web or mutually opposite, elastic, deformable clips may also be disposed on the inner side of the passage defining portion.

In addition, the inner side of the passage defining portion can have at least one undercut. The undercut serves in particular for receiving a mounting tool.

Alternatively or additionally, the cover feed-through has, on the lower side thereof (not visible from the outside), at least one support which, on the upper face side, runs radially outward on the lower side. The at least one support is formed, for example, as a line-shaped elevation. Stable self-fixing of the cover feed-through is possible by means of the support.

Furthermore, the cover feed-through can additionally have at least one orientation element, for example an arrow or another symbol, in order to provide the fitter with an orientation aid when mounting the cover feed-through on a cover.

A vehicle seat according to the invention comprises a cover and a head restraint, into which a previously described cover feed-through is disposable.

For the simple arrangement of the cover feed-through in the head restraint, the cover has a through opening from which a slot extends radially outward. The cover feed-through is inserted here into the through opening in the cover via the recess and with the aid of the slot.

The invention is described in more detail with reference to the attached schematic figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective illustration obliquely from above that shows schematically a cover feed-through;

FIG. 4 is a perspective view showing schematically one of various further embodiments of a cover feed-through;

FIG. 7 is a top view showing cover feed-through;

FIG. 8 is a top view showing cover feed-through;

FIG. 11 is a side view showing a further embodiment of the cover feed-through;

FIG. 14 is a bottom view of a further embodiment of the cover feed-through;

FIG. 15 is a bottom view of a further embodiment of the cover feed-through;

FIG. 16 is a top view of a single-part cover feed-through;

FIG. 17 presents a top view of the upper side, a side view and a top view of the lower side of a further alternative embodiment of a single-part cover feed-through;

FIG. 18 is a view showing mounting of the cover feed-through;

FIG. 19 is various illustrations of a further embodiment of a cover feed-through;

FIG. 20 is various illustrations of a further embodiment of a cover feed-through;

FIG. 21 is various illustrations of a further embodiment of a cover feed-through;

FIG. 22 is various illustrations of a further embodiment of a cover feed-through;

DESCRIPTION OF THE PREFERRED EMBODIMENTS

Mutually corresponding parts are provided with the same reference signs in all of the figures.

Figure 1:
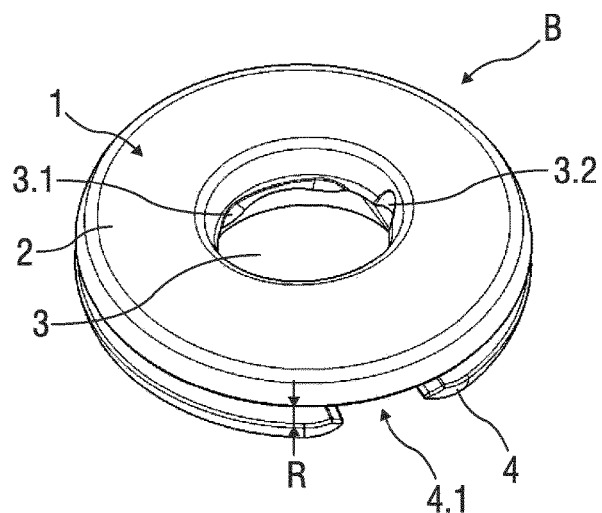

FIG. 1 shows, in a perspective view, a possible embodiment of a cover feed-through B which is designed as a single-part and self-fixing guide element 1. The cover feed-through B is designed, for example, as a plastics body produced as a single part, for example an injection molded or extruded part. The cover feed-through B is used in openings in a cover 8, in particular in a backrest cover of a vehicle seat (not illustrated specifically).

The guide element 1 comprises a closed upper side 2 and a lower side 4 which is spaced apart therefrom via a passage defining portion 3. The lower side 4 has at least one recess 4.1. The border of the recess 4.1 is rounded and is optionally formed in a tapering manner with a slightly rounded edge.

The single-part cover feed-through B is in particular of circular design and, by means of the inner passage, provided by the passage defining portion 3, is in particular of circular-ring-shaped design, or alternatively of oval design. The upper side and the lower side 2, 4 are in each case formed in the shape of a circular ring and, by means of the inner passage defining portion 3, are spaced apart from each other via an encircling radial gap R.

The upper side 2 of the cover feed-through B, which upper side is visible from the outside or from the top, is of closed design and is in particular flat and smooth. Both the outer border and the inner border of the upper side 2 are formed in a beveled manner, in particular in an obliquely beveled manner.

The inner side of the passage defining portion 3 has at least two mutually opposite, deformable, in particular elastically deformable or flexible ribs 3.1 which are formed lying radially inward from the inner side. The ribs 3.1 are formed here in the manner of thin lips, and therefore said ribs can be deformed and bent away. For this purpose, the single-part cover feed-through B is designed as a single-component plastics part, in particular an injection molded part composed of ASA. Alternatively, the single-part cover feed-through B can be formed from a two-component plastics part, wherein the plastic of the guide element 1 is stronger than the plastic of the deformable ribs 3.1.

In addition, the inner side of the passage defining portion 3 can have at least one undercut 3.2 for receiving a mounting tool. However, the cover feed-through B can also be mounted without the aid of a mounting tool.

Figure 2:
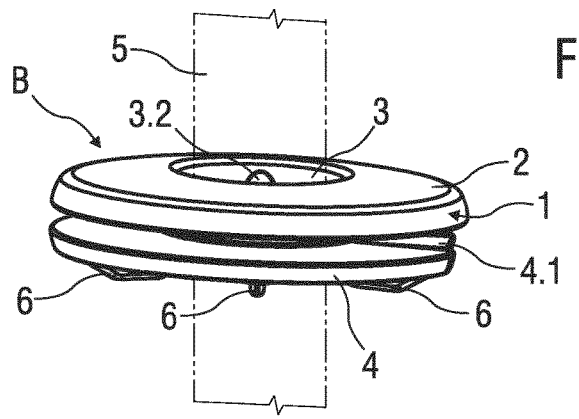
FIG. 2 is a perspective illustration slightly obliquely from the side that shows schematically a cover feed-through, with a head-restraint rod disposed in the passage.

FIG. 2 shows a further embodiment of a cover feed-through B in a perspective illustration from the side, with a head-restraint rod 5, which is disposed in the passage defining portion 3, of a head restraint (not illustrated specifically).

In addition, the cover feed-through B comprises supports 6 on the lower side 4 thereof (not visible from the outside). The supports 6 are formed as line-shaped elevations and run, on the upper face side, radially outward on the lower side 4.

Figure 3:
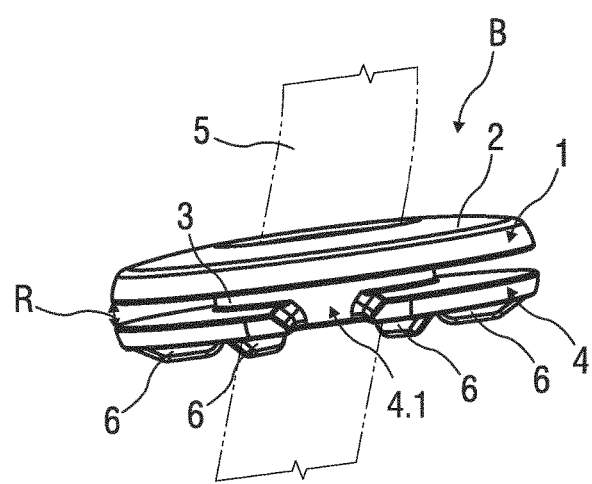
FIG. 3 is a perspective illustration slightly obliquely from the side that shows schematically a cover feed-through, with a head-restraint rod disposed in the passage.

FIG. 3 shows a further view of a cover feed-through B from the side in the region of the recess 4.1. The radial gap R between the upper side 2 and the lower side 4, and the outer wall of the passage defining portion 3, can be seen in this view. As shown, the head-restraint rod 5 is guided and disposed slightly obliquely in the cover feed-through B.

Figure 4:
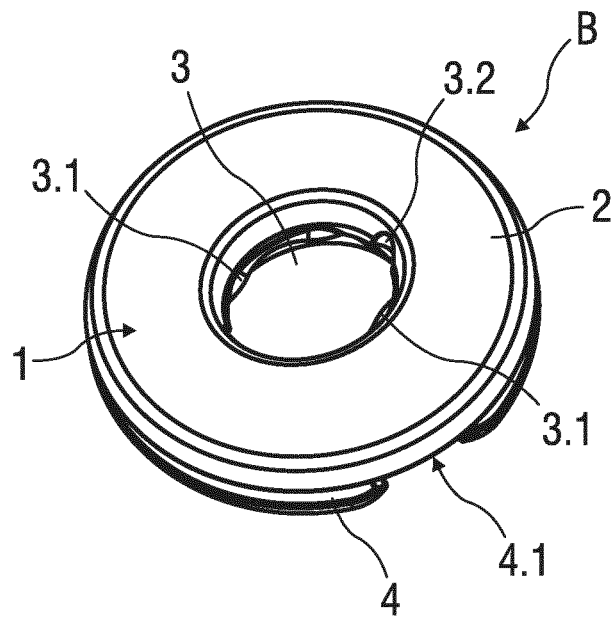
Figure 6:
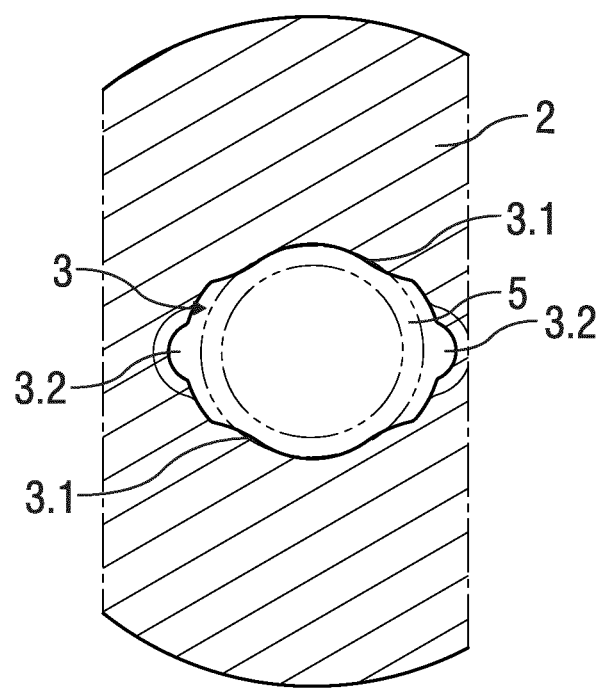
FIG. 6 is an enlarged illustration showing the upper side from below without illustrating the lower side.

As shown in FIGS. 4 and 6, for an obliquely running guidance and disposal of the head-restraint rod 5 in the cover feed-through B, the cover feed-through B has a passage defining portion 3 with an oval cross-sectional shape. The outer cross-sectional shape of the cover feed-through B is very substantially round. The oval cross section of the passage defining portion 3 is clearly visible in FIGS. 4 and 6.

Figure 5:
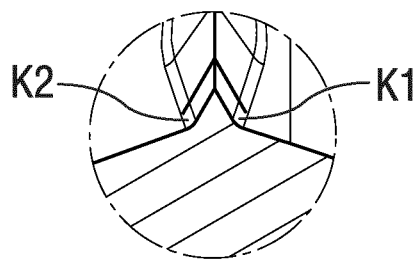
FIG. 5 is an enlarged illustration showing two contact points.

FIG. 5 shows, in an enlarged illustration, two contact points K1, K2, with which the head-restraint rod 5 comes into contact when said head-restraint rod is introduced into and positioned in the cover feed-through B.

FIG. 6 shows, in an enlarged illustration, the upper side 2 from below without illustrating the lower side 4 of the cover feed-through B.

Figure 7:
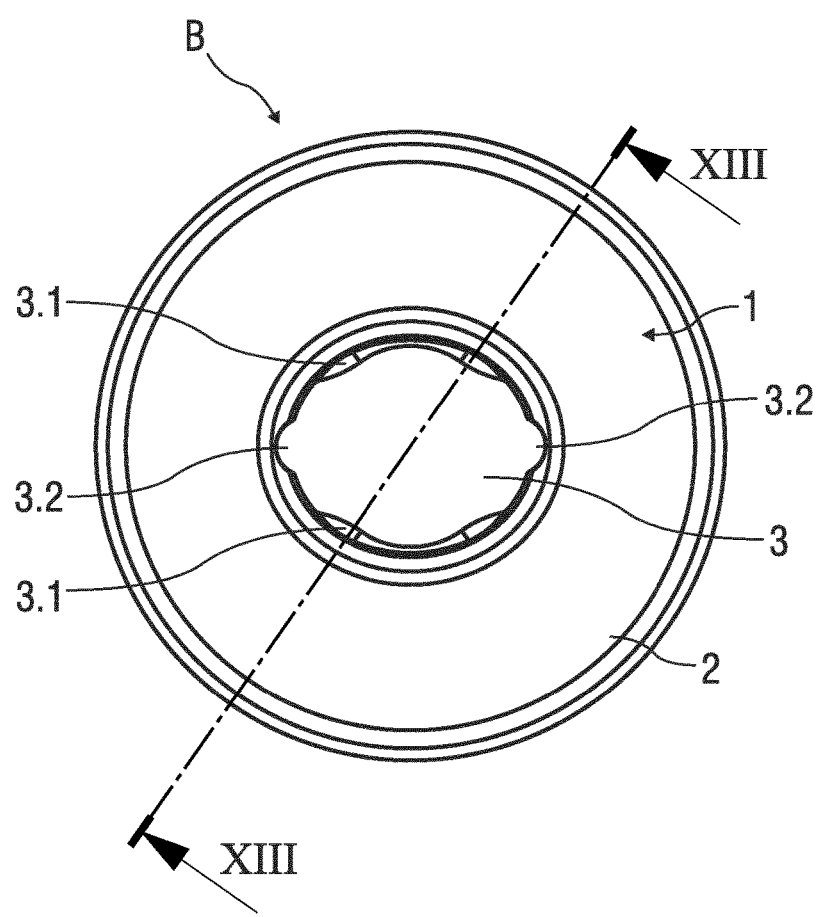

FIG. 7 shows the cover feed-through B in a top view of the upper side 2 with two deformable ribs 3.1, which are mutually opposite in the oval passage defining portion 3, and two undercuts 3.2, which are likewise mutually opposite in the passage defining portion 3.

Figure 8:
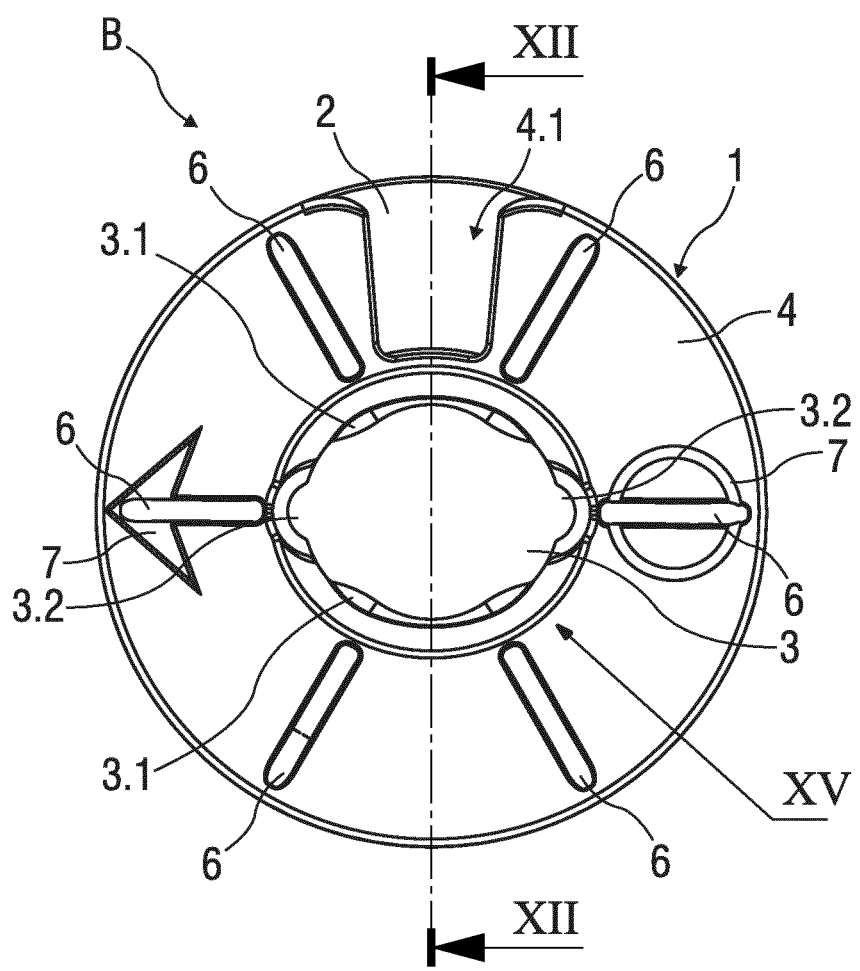

FIG. 8 shows the cover feed-through B in a top view of the lower side 4 with six supports 6 formed in particular in a symmetrically distributed manner on the upper face side. In addition, the cover feed-through B can be provided with orientation elements 7, for example an arrow or another symbol, in order to provide the fitter with an orientation aid when mounting the cover feed-through B on a cover 8. The recess 4.1 as installation aid for fastening to a cover 8 is configured in the shape of a segment of a circle. Alternatively, said recess may be in the form of a slot.

Figure 9:
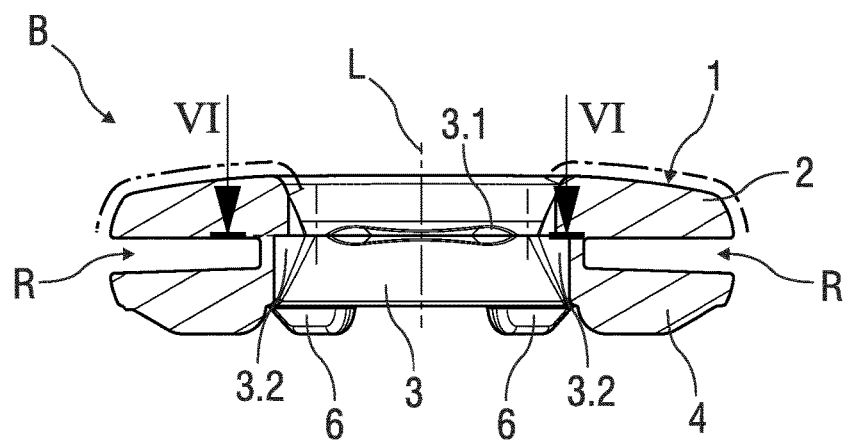
FIG. 9 is a sectional view of an embodiment of the cover feed-through taken along a longitudinal axis.
Figure 10:
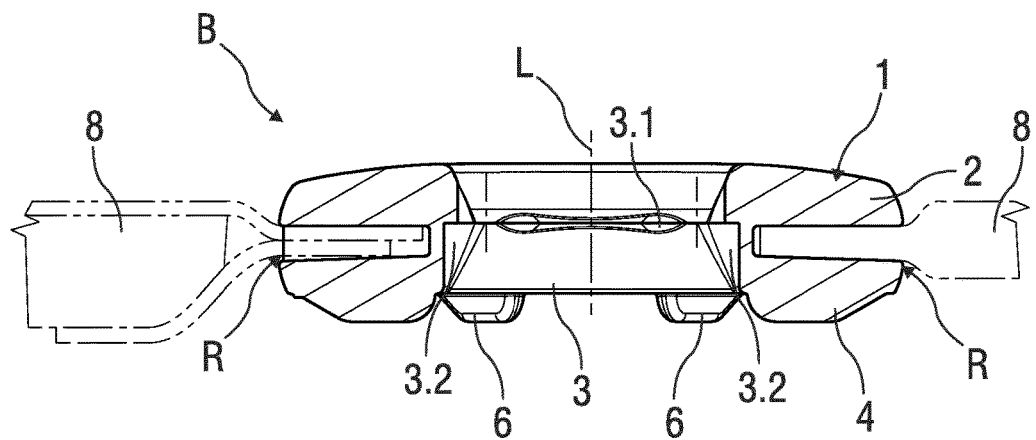
FIG. 10 is a sectional view of an embodiment of the cover feed-through taken along a longitudinal axis.

FIGS. 9 and 10 show a further embodiment of the cover feed-through B in the section along a longitudinal axis L through the undercuts 3.2, wherein a cover 8 is disposed into the radial gap R in FIG. 10.

Figure 11:
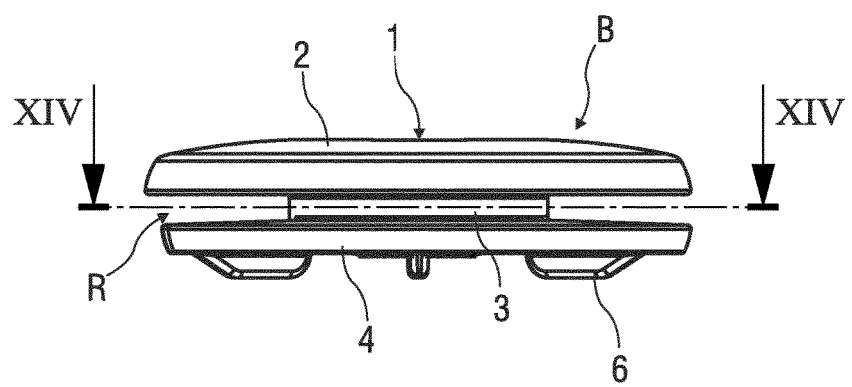

FIG. 11 shows a further embodiment of the cover feed-through B in a side view.

Figure 12:
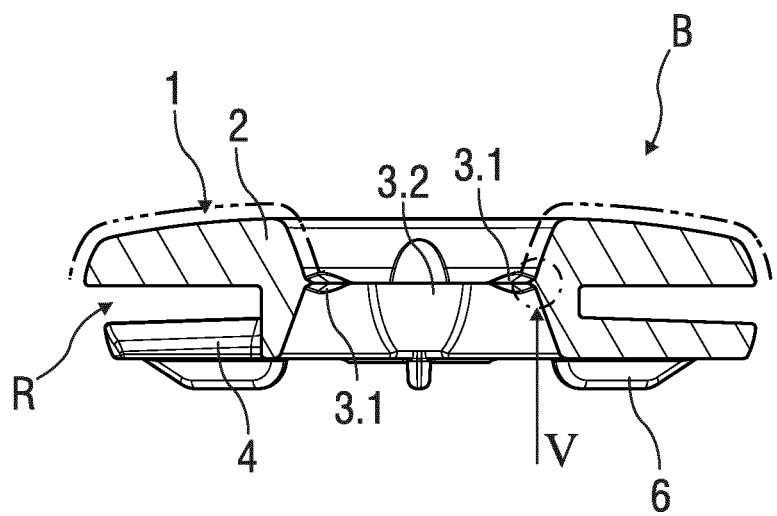
FIG. 12 is a sectional view of the cover feed-through taken along a longitudinal axis.
Figure 13:
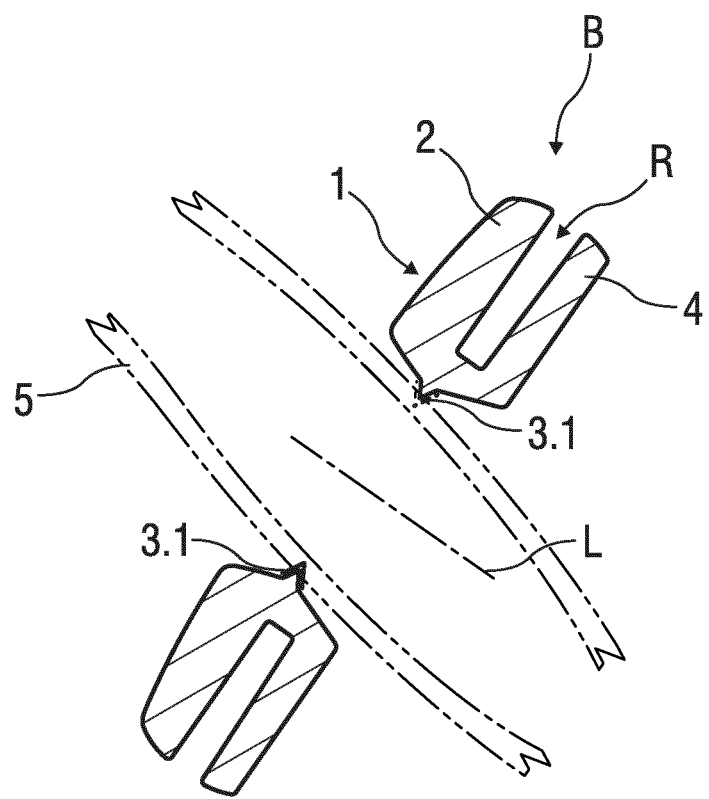
FIG. 13 is a sectional view of the cover feed-through with a head-restraint rod.

FIGS. 12 and 13 show a further embodiment of the cover feed-through B in the section along a longitudinal axis L through the ribs 3.1, wherein FIG. 13 shows the cover feed-through B with a head-restraint rod 5 which is disposed obliquely in the passage defining portion 3 and bears against the ribs 3.1.

Figure 14:
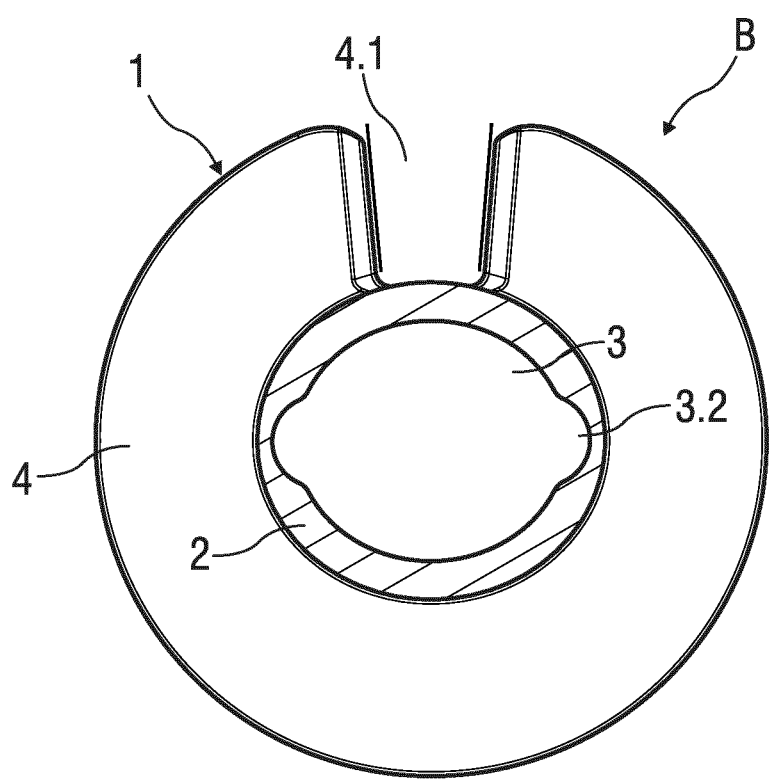
Figure 15:
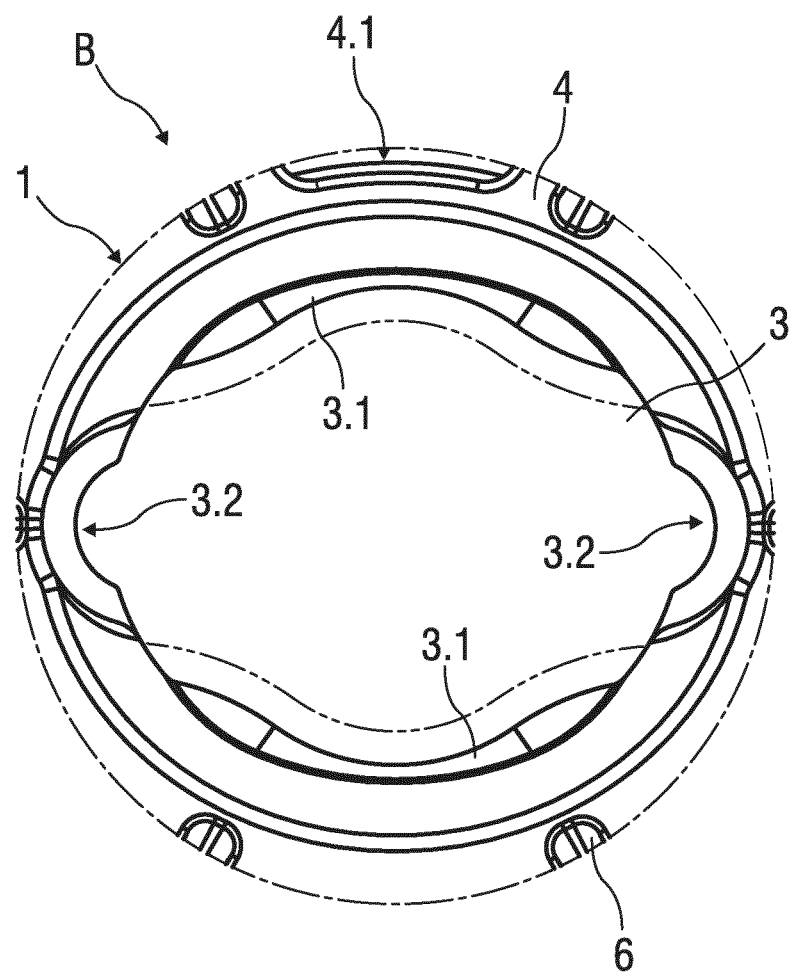

FIGS. 14 and 15 show a further embodiment of the cover feed-through B in a view from below of the lower side 4.

Figure 16:
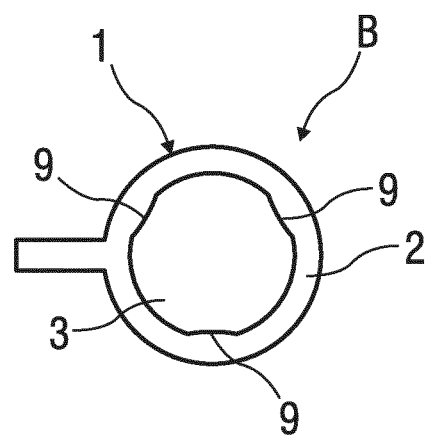

FIG. 16 shows an alternative embodiment of a single-part cover feed-through B with three curvatures 9 protruding radially inward symmetrically in the passage defining portion 3, in a top view of the upper side 2.

Figure 17:
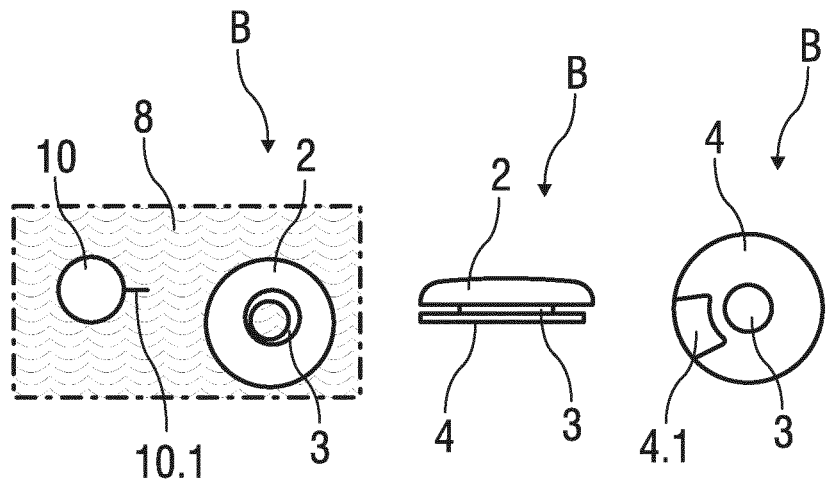

FIG. 17 shows a further alternative embodiment of a single-part cover feed-through B without additional formations or deformable elements in the passage defining portion 3 in a state mounted in the cover 8, in a top view of the upper side 2 and in a side view such that the radial gap R for receiving the cover 8 is visible, and in a top view of the lower side 4 such that the recess 4.1 is visible.

As can be seen with reference to the left-hand illustration of the cover 8, for example a backrest cover composed of material or leather, the cover 8 has a through opening 10 from which a slot 10.1 extends radially outward. Alternatively, the through opening 10 in the cover 8 can also be simply of round design without a slot 10.1.

Figure 18:
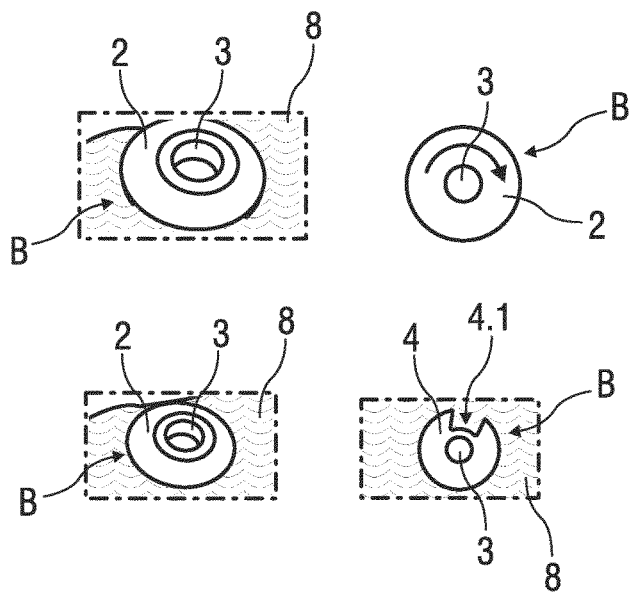

The mounting of the cover feed-through B is explained in FIG. 18 with reference to the illustrations. During the mounting of the cover feed-through B, the latter is inserted into the through opening 10 in the cover 8 via the recess 4.1 on the lower side 4 and optionally with the aid of the slot 10.1 and is rotated until the cover 8 is completely disposed in an encircling manner in the radial gap R of the cover feed-through B, and therefore the lower side 4 bears against the cover 8 below the latter and the cover feed-through B is "screwed" into the cover 8. Such a single-part cover feed-through B also permits flexible mounting even when a backrest is already covered. The cover feed-through B is fastened in the cover 8 in such a manner that said cover feed-through is movable to a limited extent axially on the head-restraint rod 5.

Figure 19:
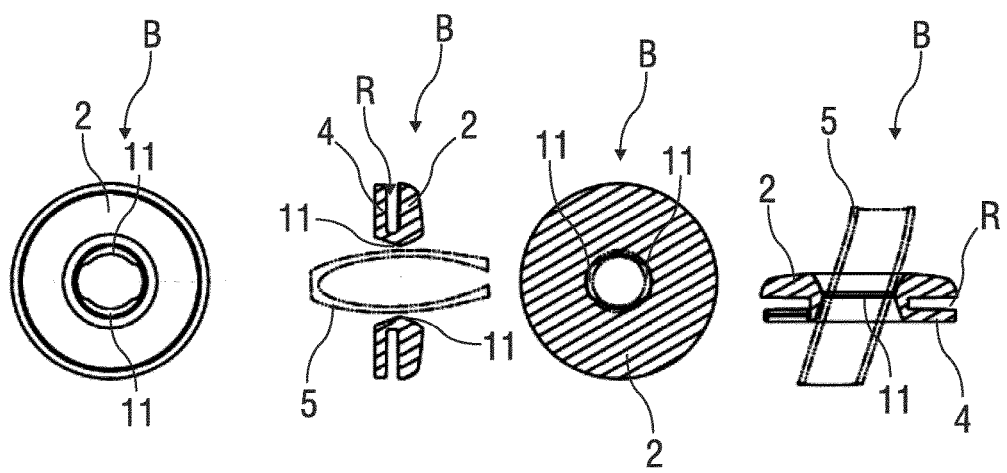

FIG. 19 shows various illustrations of a further embodiment of a cover feed-through B with an encircling, deformable inner web 11, which projects radially inward and differs in width, in the oval passage defining portion 3 without undercuts 3.2.

Figure 20:
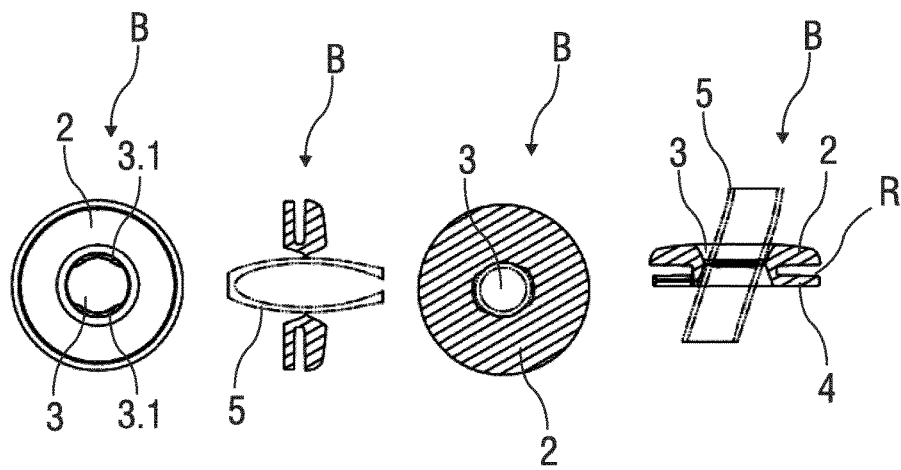

FIG. 20 shows various illustrations of a further embodiment of a cover feed-through B with the mutually opposite, deformable ribs 3.1 in the oval passage defining portion 3 without undercuts 3.2.

Figure 21:
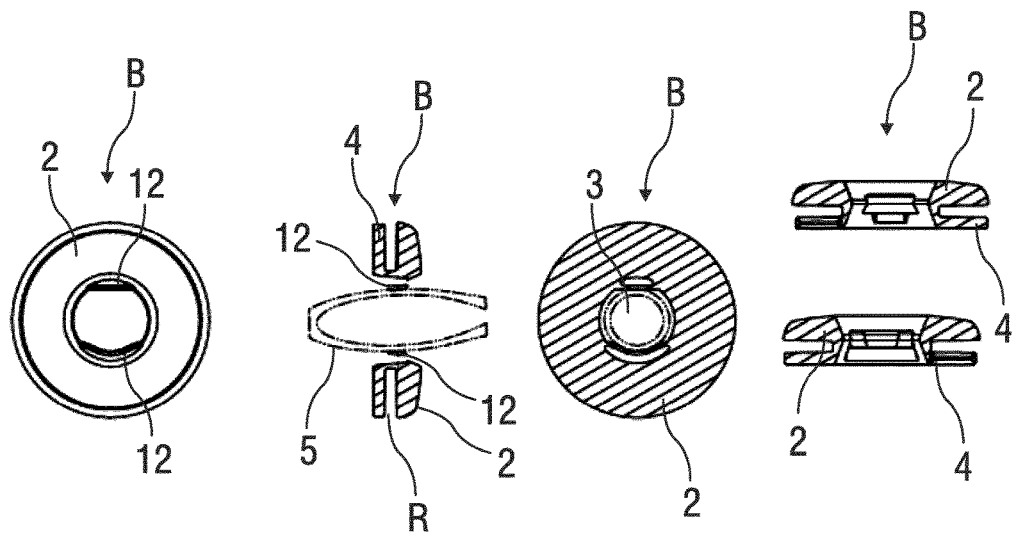

FIG. 21 shows various illustrations of a further embodiment of a cover feed-through B with mutually opposite, elastic, deformable clips 12, in the manner of spring clips or spring shackles, in the oval passage defining portion 3.

Figure 22:
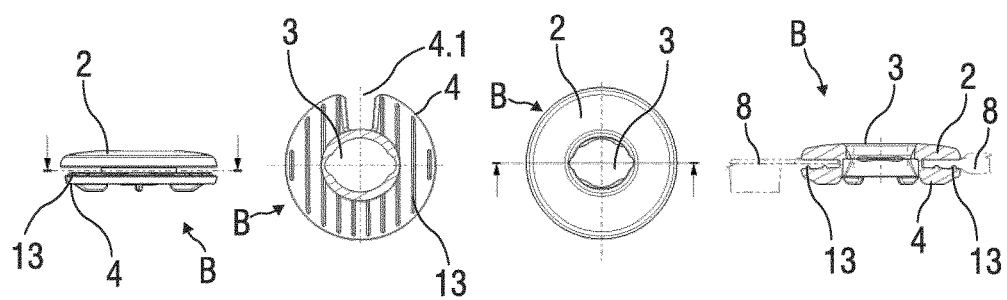

FIG. 22 shows various illustrations of a further embodiment of a cover feed-through B with formations 13, which are disposed parallel to one another, on the lower side 4 in the region of the radial gap R. The formations 13 are designed as rib-shaped elevations and run parallel to a longitudinal extent of the recess 4.1 on that side of the lower side 4 which faces the radial gap R, and therefore a height of the radial gap R is reduced in diameter at least in sections. The formations 13 serve in particular to avoid a visible gap formation when a cover 8 is disposed in the radial gap R, as may occur in particular in the case of thin materials for a cover 8, for example leather. In the exemplary embodiment shown, two covers 8 with different thicknesses are disposed in the radial gap R for illustrative purposes. This embodiment makes it possible to cover the use of different cover thicknesses with one component.

While specific embodiments of the invention have been shown and described in detail to illustrate the application of the principles of the invention, it will be understood that the invention may be embodied otherwise without departing from such principles.

The invention claimed is:

1. A cover feed-through for a head-restraint rod of a head restraint of a vehicle seat, the cover feed-through comprising:
    a single-part, self-fixing guide element comprising:
        a closed upper side;
        a lower inner side having a circular-ring-shaped design; and
        a passage defining portion, the upper side, and the lower inner side being spaced apart from each other by the passage defining portion and an encircling radial gap, in which a seat cover is disposed, wherein the lower side has at least one horizontal recess in the shape of a segment of a circle, the encircling radial gap being arranged in an encircling manner between the upper side and the lower inner side, the passage defining portion comprising an outer circumferential surface extending three-hundred and sixty degrees continuously, without interruption, about a longitudinal axis of the single-part, self-fixing guide element.

2. The cover feed-through as claimed in claim 1, wherein the self-fixing guide element has a circular configuration, the passage defining portion connecting the closed upper side to the lower inner side, the passage defining portion extending continuously, without interruption, from the closed upper side to the lower inner side.

3. The cover feed-through as claimed in claim 1, further comprising at least one orientation element.

4. The cover feed-through as claimed in claim 1, wherein at least two elastically deformable ribs are arranged opposite each other and are formed radially inwards from an inner side of the passage defining portion.

5. The cover feed-through as claimed in claim 1, wherein at least one undercut is arranged on an inner side of the passage defining portion, the closed upper side comprising a closed upper side diameter, the lower inner side comprising a lower inner side diameter, the lower inner side diameter being equal to the close upper side diameter.

6. The cover feed-through as claimed in claim 1, wherein at least one support runs radially outward on a surface of the lower side.

7. A vehicle seat comprising:
a cover; and
a head restraint comprising a head restraint rod, which is connected to a cover feed-through, the cover feed-through comprising a single-part, self-fixing guide element comprising: a closed upper side; a lower side; and a passage defining portion, the upper side and the lower side being spaced apart from each other by the passage defining portion, wherein the lower side has at least one horizontal recess in a shape of a segment of a circle, the passage defining portion extending continuously, without interruption, from the upper side to the lower side, wherein the upper side is connected to the lower side via the passage defining portion, wherein at least one undercut is arranged on an inner side of the passage defining portion, the passage defining portion comprising an outer circumferential surface extending three-hundred and sixty degrees about a longitudinal axis of the single-part, self-fixing guide element, wherein the outer circumferential surface is free of openings.

8. A vehicle seat comprising:
a cover; and
a head restraint comprising a head restraint rod, which is connected to a cover feed-through, the cover feed-through comprising a single-part, self-fixing guide element comprising: a closed upper side; a lower side; and a passage defining portion, the upper side and the lower side being spaced apart from each other by the passage defining portion, wherein the lower side has at least one horizontal recess in a shape of a segment of a circle, the passage defining portion extending continuously, without interruption, from the upper side to the lower side, wherein the upper side is connected to the lower side via the passage defining portion, the self-fixing guide element having a circular configuration, the passage defining portion comprising an outer circumferential surface extending three-hundred and sixty degrees continuously, without interruption, about a longitudinal axis of the single-part, self-fixing guide element.

9. The vehicle seat as claimed in claim 8, wherein the cover has a through opening from which a slot extends radially outward, the closed upper side comprising a closed upper side diameter, the lower inner side comprising a lower inner side diameter, the lower inner side diameter being equal to the closed upper side diameter.

10. The vehicle seat as claimed in claim 8, further comprising at least one orientation element.

11. The vehicle seat as claimed in claim 8, wherein a radial gap is arranged in an encircling manner between the upper side and the lower side, at least a portion of the cover being arranged in the radial gap, wherein the cover feed-through engages the portion of the cover.

12. The vehicle seat as claimed in claim 8, wherein at least two elastically deformable ribs are arranged opposite each other and are formed radially inwards from an inner side of the passage defining portion.

13. The vehicle seat as claimed in claim 8, wherein at least one undercut is arranged on an inner side of the passage defining portion, the passage defining portion comprising an outer circumferential surface extending three-hundred and sixty degrees about a longitudinal axis of the single-part, self-fixing guide element, wherein the outer circumferential surface is free of openings.

14. The vehicle seat as claimed in claim 8, wherein at least one support runs radially outward on a surface of the lower side.

15. A cover feed-through for a head-restraint rod of a head restraint of a vehicle seat, the cover feed-through comprising:
a single-part, self-fixing guide element comprising a longitudinal axis, a closed upper side portion, a lower side portion and a passage defining portion, the passage defining portion maintaining the lower side portion at a spaced location from the closed upper portion, the lower side portion comprising a first end portion and a second end portion, the first end portion being located at a spaced location from the second end portion in a circumferential direction with respect to the longitudinal axis, at least the first end portion and the second end portion defining at least one circumferential horizontal recess, the passage defining portion extending continuously, without interruption, from the closed upper side portion to the lower side portion, the at least one circumferential horizontal recess being perpendicular to the longitudinal axis, the passage defining portion comprising an inner surface extending three-hundred and sixty degrees about the longitudinal axis of the single-part, self-fixing guide element, the inner surface defining a through opening, wherein the inner surface is free of circumferential openings.

16. The cover feed-through as claimed in claim 15, wherein the passage defining portion comprises a passage defining portion outer circumferential surface, at least a portion of the passage defining portion outer circumferential surface defining the at least one circumferential recess, the closed upper side portion comprising a closed upper side outer peripheral surface, the lower side portion comprising a lower side portion outer peripheral surface, the passage defining portion outer circumferential surface being located radially inward of the closed upper side outer peripheral surface and the lower side portion outer peripheral surface with respect to the longitudinal axis, the passage defining portion comprising an outer circumferential surface extending three-hundred and sixty degrees continuously, without interruption, about the longitudinal axis of the single-part, self-fixing guide element.

17. The cover feed-through as claimed in claim 16, wherein the first end portion is located opposite the second end portion in the circumferential direction, the portion of the passage defining portion outer circumferential surface extending at least between the first end portion and the second end portion, the passage defining portion being free of circumferential openings.

18. The cover feed-through as claimed in claim 15, wherein the lower side portion comprises an upper circumferential surface, the upper side portion comprising a lower circumferential surface, the upper circumferential surface being located axially opposite the lower circumferential surface with respect to the longitudinal axis, the passage defining portion comprising a passage defining portion outer circumferential surface, at least a portion of the passage defining portion outer circumferential surface, the lower circumferential surface and the upper circumferential surface defining a circumferential gap, the closed upper side comprising a closed upper side diameter, the lower inner side comprising a lower inner side diameter, the lower inner side diameter being equal to the closed upper side diameter.

19. A cover feed-through for a head-restraint rod of a head restraint of a vehicle seat, the cover feed-through comprising:

a single-part, self-fixing guide element comprising:
- an upper side having a ring-shaped design;
- a lower side having a ring-shaped design; and
- a passage defining portion, the upper side and the lower side being spaced apart from each other by the passage defining portion and an encircling radial gap, in which a seat cover is disposed between the upper side and the lower side, wherein the lower side has at least one horizontal recess in the shape of a segment of a circle, the upper side having an inner upper side diameter and an outer upper side diameter, the lower side having an inner lower side diameter and an outer lower side diameter, wherein the inner upper side diameter and the inner lower side diameter are equal.

20. The cover feed-through as claimed in claim 19, wherein the upper side is an upper outer side and the lower side is a lower inner side.

21. The cover feed-through as claimed in claim 19, wherein the upper side has an inner upper side opening and an outer upper side edge, the lower side having an inner lower side opening and an outer lower side edge, the horizontal recess extending from the outer lower side edge to the inner lower side opening.

22. The cover feed-through as claimed in claim 21, wherein the passage defining portion connects the inner upper side opening and the inner lower side opening with each other.

23. The cover feed-through as claimed in claim 21, wherein the inner upper side opening and the inner lower side opening have a same shape.

24. The cover feed-through as claimed in claim 21, wherein the outer upper side edge and the outer lower side edge have a same shape.

* * * * *